Sept. 20, 1938.  F. SIGNORI  2,130,448
TRACTION ATTACHMENT
Filed Oct. 15, 1937
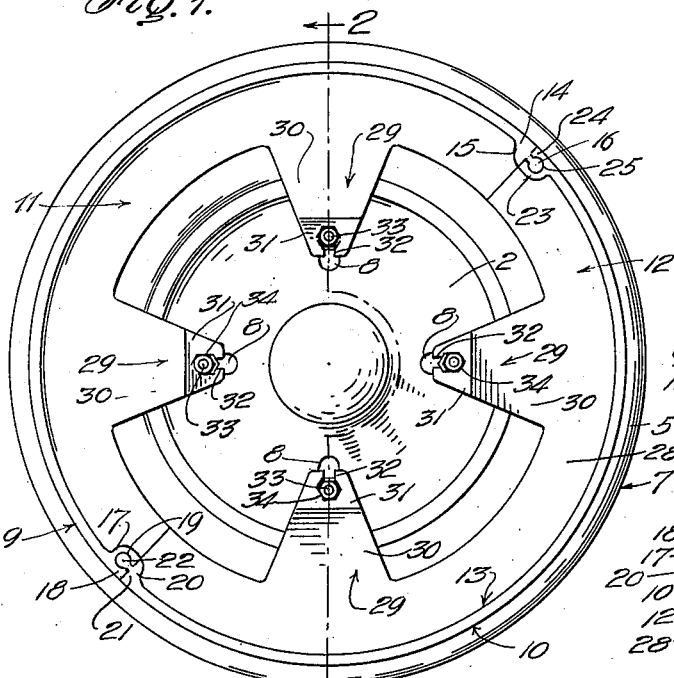
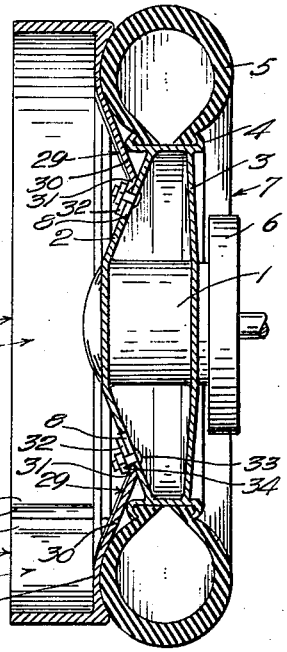
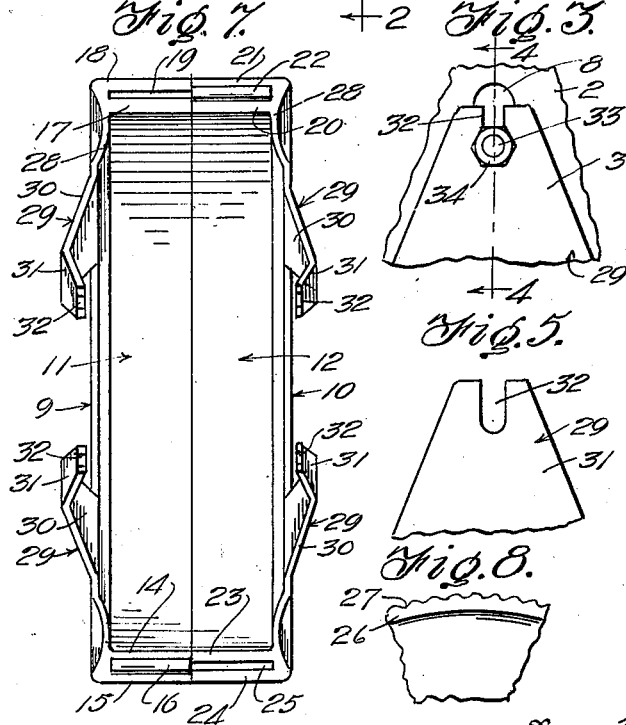
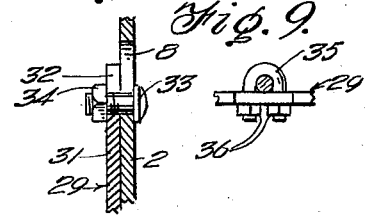
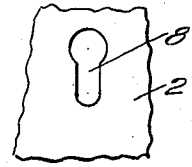
Inventor
FRANK SIGNORI,
By Kimmel & Crowell
Attorneys Patented Sept. 20, 1938

2,130,448

UNITED STATES PATENT OFFICE 2,130,448

TRACTION ATTACHMENT

Frank Signori, Reno, Nev.

Application October 15, 1937, Serial No. 169,302

4 Claims. (Cl. 301—39)

This invention relates to a traction attachment designed primarily for vehicle wheels provided with pneumatic tires, but it is to be understood that an attachment, in accordance with this invention, is for use in any connection for which it may be found applicable, and the invention has for its object to provide, in a manner as hereinafter set forth, an attachment of the class referred to for lateral disposition relative to the outer side of a vehicle wheel for imparting traction to the latter when the vehicle is travelling through snow, more particularly a snowdrift.

The invention further aims to provide, in a manner as hereinafter set forth, an attachment of the class referred to in the form of an annular body for anchoring stationary to the outer side of the vehicle wheel, of less diameter than the diameter of the wheel and providing a wide tread surface for creating traction for the wheel when the latter sinks in the snow.

Further objects of the invention are to provide, in a manner as hereinafter set forth, an attachment for the purpose referred to which is simple in its construction, strong, durable, compact, expeditiously installed with and removed from the wheel, readily assembled, thoroughly efficient in its use, and comparatively inexpensive to manufacture.

To the above ends essentially and to others which may hereinafter appear, the invention consists of the novel construction, combination and arrangement of parts as will be more specifically described and illustrated in the accompanying drawing wherein is shown an embodiment of the invention, but it is to be understood that changes, variations and modifications may be resorted to which fall within the scope of the invention as claimed.

In the drawing:

Figure 1 is an elevation of the attachment showing the adaptation thereof with respect to the outer side of a cushioned vehicle wheel of the disc type, Figure 2 is a section on line 2—2, Figure 1, Figure 3 is a fragmentary view upon an enlarged scale and in front elevation illustrating one of the couplers of the attachment anchored to a portion of the outer web of the wheel, Figure 4 is a section on line 4—4, Figure 3, Figure 5 is a fragmentary view upon an enlarged scale and in front elevation illustrating the form of the couplers employed for the traction members, Figure 6 is a fragmentary view upon an enlarged scale and in front elevation of the outer web of the wheel, Figure 7 is an elevation illustrating the manner in which the traction members may be arranged when not in use, Figure 8 is a fragmentary view of a modified form of traction member looking towards its outer edge, and Figure 9 is a sectional detail illustrating the manner in which a coupler is attached to a wheel of the wire or wooden spoke type.

With reference to Figure 2, 1 indicates the hub, 2, 3 respectively the outer and inner webs, 4 the rim, 5 the tire, and 6 the brake drum of a pneumatic tire wheel 7 of the disc type now generally in use. For the purpose of adapting the attachment with respect to the wheel 7, the outer web 2 of the latter is formed with spaced keyhole-shaped openings 8.

The attachment includes a pair of traction members 9, 10 including body parts 11, 12 respectively in the form of a semi-circular band constructed from metallic material of suitable thickness. The body parts 11, 12 when the attachment is used, coact in a manner to form an annulus 13 (Figure 1). The body parts 11, 12 are of like length. When the body parts are set up to form the annulus 13, the latter provides a traction creating means for the wheel to which the attachment is connected. When the body parts are set up to provide the annulus 13, the outer diamter of the latter is less than the outer diameter of the wheel.

The body part 11 at one end is enlarged as at 14 for the purpose of increasing the width of the edge 15 at such end. Integral with and extended from such edge 15 is an extension 16 providing the male section of a fastener. The body part 11 is enlarged at its other end as at 17 for the purpose of increasing the width of the edge 18 at such end and said enlargement 17 is formed with a keyhole-shaped socket 19 forming the female section of a fastener.

The body part 12 at one end is enlarged as at 20 for the purpose of increasing the width of the edge 21 at such end. Integral with and extended from such edge 21 is an extension 22 providing the male section of a fastener and which coacts with the socket 19 on body part 11. The body part 12 is enlarged at its other end as at 23 for the purpose of increasing the width of the edge 24 at such end and said enlargement 23 is formed with a keyhole-shaped socket 25 forming the female section of a fastener for receiving the extension 16 of the body part 11. The extensions in cross section correspond in contour to the sockets. The extension 16 coacts with the socket 25 and the extension 22 coacts with the socket 18 for the purpose of maintaining the end edges of the body parts 11, 12 in abutting relation and further for detachably connecting the said body parts together to form the annulus 13. The body parts 11, 12 are smooth, but if desired they may be corrugated transversely in a manner as shown in Figure 8 and with reference to the latter, the body part is designated 26 and the corrugations thereof at 27.

The body part 11, as well as the body part 12 has extending inwardly from its inner side edge a flange 28 which at its ends merges into the enlargements on the body parts and further has its ends flush with the end edges of the body part. In cross section the flange 28 is of concavo convex contour and with the concave on the rear face of the flange. Formed integral with the inner edge of flange 28 is a pair of spaced couplers 29 which are also spaced from the ends of the flange. Each coupler 29 includes a part 30 inclining rearwardly from flange 28 and a part 31 inclining forwardly with respect to the part 30. The part 30 merges at one end into the flange 28 and at its other end into one end of the part 31. The latter is formed lengthwise therof with a cutout 32 opening centrally of the other end of part 31. Each coupler 29 is of substantially triangular contour.

When the body parts 11, 12 are connected together to provide the annulus and the attachment is to be anchored to the wheel, the annulus 13 is positioned against the outer side of the wheel with the tire 5 having its outer side arranged in the concave face of the flanges 28. The couplers 29 extend towards the web 2 and the parts 31 of the couplers seat on the web 2 with the notches 32 of the part 31 registering with the narrow part of the openings 8. The couplers are then removably anchored to the web 2 and for such purpose bolts 33 and nuts 34 are employed. Each bolt is inserted through the larger portion of an opening 8 and then dropped down into the narrow portion of such opening and into a cutout 32, after which the nut 34 is screwed home on the bolt to bind against the part 31 of the coupler (Figure 4). When the attachment is secured to the wheel 7 it will appear as shown in Figure 2 and with the outer or tread surface of the body parts 11, 12 arranged inwardly with respect to the tread surface of the tire 5.

When the attachment is used in connection with the wheel of the spoke type, either wooden or wire spoke, bolts 35 of the U-type and nuts 36 coacting with the bolts are employed for detachably anchoring the attachment to the wheel and in this connection attention is directed to Figure 9.

The attachment when active is arranged in such relation with the wheel whereby if the tire 5 sinks in the snow the annulus 13 having a broad seating surface will function to impart traction to the wheel.

When the attachment is not in use the traction members may be arranged in the manner as shown in Figure 7 for storage.

What I claim is:

1. In a vehicle wheel having a central web, rim and shoe, a traction attachment therefor including semi-circular sections each formed with an outer cylindrical peripheral surface and having a side flange at one edge, the ends of said sections abutting each other and formed with inter-engaging endwise slidable connectors to form a circular auxiliary tire with its outer side entirely open, the side flange being integral with the outer surface and forming a smooth edge therewith, and being concave to seat on one side and fit against a tire shoe, said flange extending centrally beyond the center of said shoe with short triangular shape couplers extending inwardly diametrically towards each other with an attaching slot in each inner end, and being inwardly bent towards the wheel to contact the rim and central web thereof and then bent outward to secure close contact with said web for attachment thereto.

2. In a vehicle wheel having a central web, rim and shoe, a traction attachment therefor including semi-circular sections each formed with an outer cylindrical peripheral surface and having a side flange at one edge, the ends of said sections abutting each other and formed with inter-engaging endwise slidable connectors to form a circular auxiliary tire with its outer side entirely open, the side flange being integral with the outer surface and forming a smooth edge therewith, and being concave to seat on one side and fit against a tire shoe, said flange extending centrally beyond the center of said shoe with short triangular shape spaced radially disposed couplers extending inwardly with an attaching slot in each inner end, and being inwardly bent towards the wheel to contact the rim and central web thereof and then bent outward to secure close contact with said web for attachment thereto.

3. In a vehicle wheel having a central web, rim and shoe, a traction attachment therefor including semi-circular sections each formed with an outer cylindrical peripheral surface and having a side flange at one edge, the ends of said sections abutting each other and formed with inter-engaging endwise slidable connectors to form an auxiliary tire annulus with its outer side entirely open, the side flange being integral with the outer surface and forming a smooth edge therewith, and being concave to seat on one side and fit against a tire shoe, said flange extending centrally beyond the center of said shoe with short triangular shape couplers extending inwardly diametrically towards each other with an attaching slot in each end and being inwardly bent towards the wheel to contact the rim and central web thereof and then bent outward to secure close contact with said web for detachable anchoring thereto to retain the annulus in laterally extended position.

4. The device as specified in claim 1 and each of said flanges being of concavo-convex cross section and said couplers having oppositely inclined parts.

FRANK SIGNORI.